United States Patent [19]

Ferrieu et al.

[11] 3,868,574

[45] Feb. 25, 1975

[54] ARRANGEMENT FOR THE TRANSMISSION OF INFORMATION SIGNALS BY PULSE CODE MODULATION

[75] Inventors: Gibert Marie Marcel Ferrieu, Bievres, France; Johannes Wilhelmus Glasbergen, Bussum, Netherlands

[73] Assignee: Telecommunications Radioelectriques et Telephoniques T.R.T., Paris, France

[22] Filed: Aug. 29, 1973

[21] Appl. No.: 392,792

[30] Foreign Application Priority Data

Sept. 4, 1972 France ............................ 72.31270

[52] U.S. Cl. ........................... 325/38 B, 179/15 AV

[51] Int. Cl. .......................................... H04b 1/00

[58] Field of Search.. 325/38 B; 179/15 AV, 15 AZ; 329/104; 332/11 D

[56] References Cited

UNITED STATES PATENTS

| | | | |
|---|---|---|---|
| 3,518,548 | 6/1970 | Greefkes | 332/11 D |
| 3,723,909 | 3/1973 | Condon | 332/11 D |
| 3,729,678 | 4/1973 | Glasbergen et al. | 325/38 B |

*Primary Examiner*—Robert L. Griffin
*Assistant Examiner*—George H. Libman
*Attorney, Agent, or Firm*—Frank R. Trifari; Simon L. Cohen

[57] ABSTRACT

An arrangement for the transmission of information signals by pulse code modulation.

A transmission arrangement which uses delta modulation in which the transmitter and the receiver include a dynamic control system with a pulse series analyser supplying control pulses.

This analyser is connected to a non-linear integrating network including a capacitor in parallel with at least one diode. The integrating network is connected to a switched supply source which is activated by the control pulses. The dynamic control signal is derived from the current through the diodes.

19 Claims, 8 Drawing Figures

ARRANGEMENT FOR THE TRANSMISSION OF INFORMATION SIGNALS BY PULSE CODE MODULATION

The invention relates to an arrangement for the transmission of information signals by pulse code modulation, the transmitter being provided with a modulator to which a pulse generator is connected, the output pulses from said modulator being transmitted to a receiver cooperating with the transmitter and to a comparison circuit comprising an integrating network and a difference producer for generating a difference signal indicating the difference between the signals to be transmitted and a comparison signal which is obtained by integration of the output pulses from said modulator, which pulses are applied to the integrating network in the comparison circuit, said difference signal controlling the modulator.

Pulse code modulation is also understood to mean delta modulation and delta-sigma modulation.

In order to improve the reproducing quality in such an arrangement by a considerable reduction of the quantization noise and to make the transmission of the signal possible with a considerable reduction of the pulse frequency of the pulse generator, it is common practice to use a dynamic control device in the transmitter and the receiver of such a transmission arrangement of the type as described, for example, in French Patent Specification No. 2,004,446 corresponding to U.S. Pat. No. 3,729,678, to Glasbergen et al. This device is controlled by a continuously variable dynamic control signal which is supplied by a dynamic control signal generator including a pulse series analyser to which the output pulses from the pulse code modulator are applied. The pulse series analyser analyses pulse series which are constituted by the output pulses from the modulator supplied in a fixed time interval of at least three successive pulses from the pulse generator and supplies a pulsatory output signal when previously determined pulse series occur. These previously determined pulse series characterize within said fixed time interval the exceeding of an instantaneous modulation index of high value. For generating said continuously variable dynamic control signal the dynamic control voltage generator is provided with an integrating network connected to the output of the analyser from which network said control signal is derived.

In practice this dynamic control system specially adapted to the properties of the delta or delta-sigma modulation systems provides considerable advantages such as a very high compression factor over a control range in the order of 40 dB, a high degree of insensitivity to noise, particularly for information signals of low levels. In addition this system provides the possibility of being built with digital elements, which makes the construction as regards insensitivity to tolerances particularly attractive for integration body, a semiconductor bodoy, etc.

An object of the invention is to provide a novel conception of an arrangement of the kind described in the preamble in which the reproducing quality is considerably improved while maintaining the said advantages; the contro, range of the dynamic control is considerably broadened and the stability of the transmission arrangement is increased.

To this end the arrangement according to the invention is characterized in that the integrating network connected to the output of the pulse series analyser and comprising a storage element and a resistance element is constituted by a non-linear circuit which has a time constant decreasing with an increasing signal level, said non-linear integrating network being connected to a switched supply source and being switched in the rhythm of the pulsatory output signal from the pulse series analyser, the dynamic control signal being derived from the resistance element of the non-linear integrating network.

As was found in practice by the Applicant the arrangement such as described in the above-mentioned French Patent Specification No. 2,004,446 has the unwanted phenomenon that when the dynamic control system becomes active the quantization noise starts to increase to a great extent within the time intervals of low values of the information signal.

Not only is the latter unwanted phenomenon prevented by using the steps according to the invention, but in addition a considerable improvement is achieved relative to the adaptation rate of the dynamic control signal to the instantaneous variations of the values of the information signal. Both effects result in a considerable improvement of the reproducing quality and in an increase of the stability of the transmission arrangement while the dynamic control range has increased to a value in the order of 60 dB.

Extensive investigations of the arrangement according to the invention have proved that optimum results are obtained in practice by using integrating networks with a storage element in the form of a linear capacitor and a non-linear resistor in the form of a characteristic *p-n* or *n-p* contact resistor of a diode or a transistor.

The invention will be described in greater detail with reference to the Figures.

Figure 1:
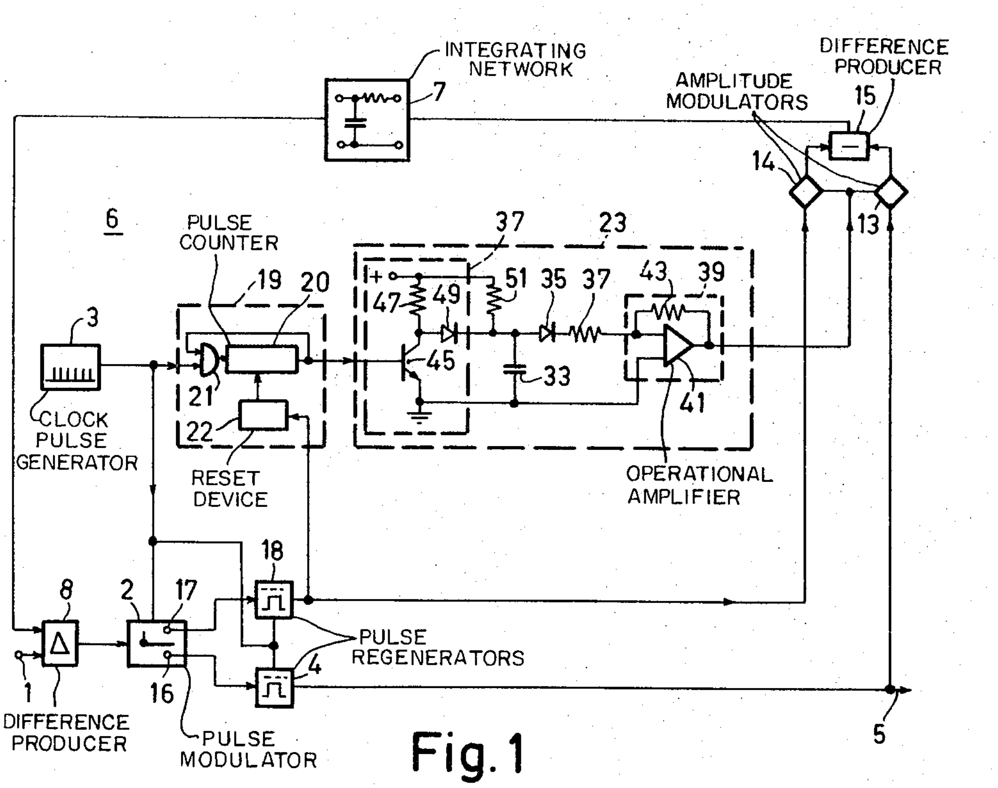
FIGS. 1 and 2 show a transmitter and a receiver for delta modulation according to the invention.

The transmitter according to the invention shown in FIG. 1 is adapted for the transmission of analog signals by means of delta modulation. These signals are, for example, speech signals which are applied to the input terminal 1 after filtering and amplification. This transmitter includes the pulse modulator 2 which is connected to the clock pulse generator 3 and whose output pulses are transmitted after regeneration in the pulse regenerator 4 through a transmission line 5 to the receiver cooperating with this transmitter. The regenerated output pulses from modulator 2 are also applied to a feedback circuit 6 which includes an integrating network 7 and a difference producer 8. The signal to be transmitted which is applied to terminal 1 and a comparison signal supplied by the integrating network 7 are applied to the difference producer 8. The difference signal between these two signals controls the modulator 2 which as a result of the polarity of the difference signal either passes or suppresses the output pulses from generator 3. The pulses passes and transmitted by this modulator 2 are indicated, for example, as 1-pulses whereas the suppressed pulses are indicated as 0-pulses.

Thus the transmitter supplies at instants determined by the generator 3 either a 1 pulse or a 0 pulse which characterizes the polarity of the the difference between the instantaneous value of the signal to be transmitted and the instantaneous value of the comparison signal at the instant when the next pulse from generator 3 appears, that is to say, the slope of the signal to be transmitted is characterized at these instants.

The signal supplied by the integrating network 7 is a quantized approximation of the signal to be transmitted and the approximation is the better as the frequency of the output pulses from generator 3 is higher.

Figure 2:
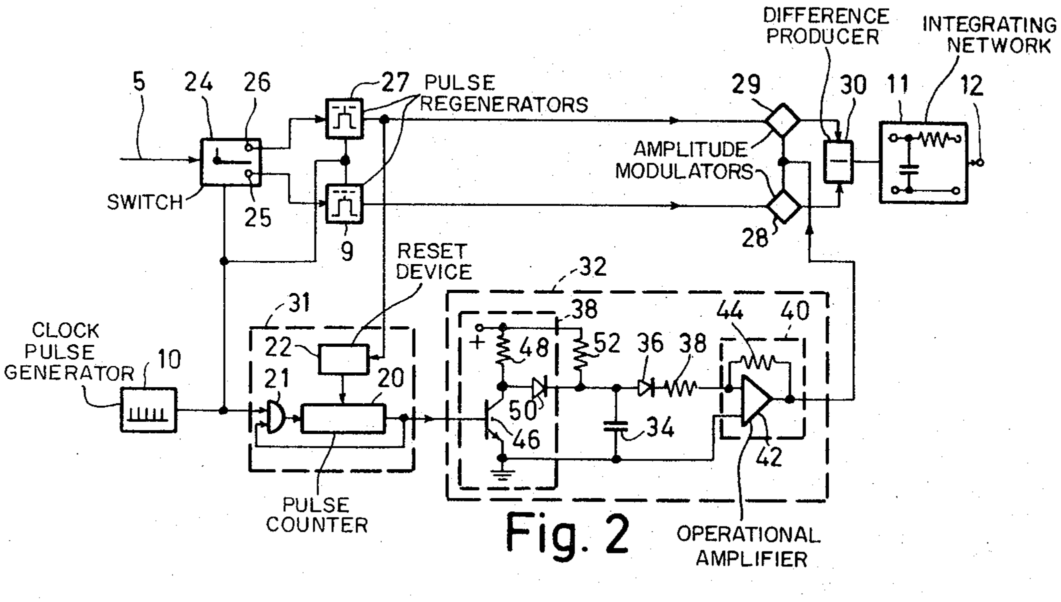

FIG. 2 shows a receiver which can cooperate with the transmitter of FIG. 1. The pulses received through line 5 are regenerated in a pulse regenerator 9 to which control pulses are applied which originate from a local clock pulse generator 10 synchronized with the pulse generator 3 in the transmitter. These regenerated pulses are applied to the integrating network 11 which corresponds to the integrating network 7 of the transmitter so that a voltage corresponding to the comparison voltage of the transmitter appears at the output 12 of the integrating network 11. The voltage obtained at terminal 12 is applied, for example, to a sound reproducer.

As compared with the signal to be transmitted and applied to the transmitter, the signal supplied by the integrating network is beset with quantization noise whose magnitude is dependent inter alia on the frequency of the pulses from generator 3; the quantization noise decreases when this frequency increases. Since this noise is independent of the amplitude of the signal, it is very detrimental to the reproducing quality of signals having low levels.

In order to decrease this quantization noise without increasing the frequency of the pulses to be transmitted, it is known to use dynamic control systems in the transmitter and in the receiver with which the magnitude of the quantization step can be continuously adapted to the slope of the analog information signal. According to, for example, said French Patent Specification No. 2,004,446 corresponding to U.S. Pat. No. 3,729,678, to Glasbergen et al, the magnitude of the quantization step is derived from the series of transmitted pulses so that in the receiver an expansion corresponding to the compression of the signal in the transmitter can be realized. The transmitter and the receiver of FIGS. 1 and 2 are provided with the dynamic control system described in said patent specification.

In the transmitter of FIG. 1 particularly the amplitude of the pulses applied to the integrating network 7 is varied in a dynamic control device which is constituted by two amplitude modulators 13 and 14 whose output pulses are applied through a difference producer 15 to the integrating network 7. The pulses to be amplitude-modulated and applied to the amplitude modulators 13 and 14 are supplied by the two complimentary outputs 16 and 17, respectively, of the modulator 2 through the pulse regenerators 4 and 18. Both amplitude modulators 13 and 14 are controlled by a continuously variable dynamic control signal which is supplied by a dynamic control signal generator constituted by a cascade arrangement of a pulse series analyzer 19 and an integrating network 23.

The pulse series analyzer is fed by the output pulses from pulse modulator 2. This analyzer analyzes the configurations of pulse series successively occurring at the output of the modulator 2, which pulse series are formed every time by the output pulses from the modulator 2 occurring in a fixed and limited time interval of at least three successive pulses from the pulse generator 3. Whenever previously determined pulse series appear which correspond to the exceeding of an instantaneous modulation index of high values within the said fixed time interval, the analyzer provides a pulsatory output signal. In the embodiment shown the analyzer 19 has a pulse counter 20 having four positions so as to analyze the structure of the pulse series constituted by output pulses from the pulse modulator 2 and occurring in a time interval of four successive pulses from generator 3. The pulse counter is fed by the output pulses from generator 3 through an AND gate 21. This AND gate 21 is used to maintain the counter in its final position when this position is reached. The counter 20 is reset to zero by a reset device 22 whenever a series of output pulses from modulator 2 consisting of either exclusively "1" pulses or exclusively "0" pulses is interrupted by a "0" pulse or a "1" pulse. The analyzer 19 then only provides a voltage when four "1" pulses or four "0" pulses successively appear at the output of modulator 2. The pulse signal which occurs at the output of the analyzer 19 is integrated by the integrating network 23 so as to obtain a smoothed dynamic control signal controlling the amplitude modulators 13 and 14.

In the receiver of FIG. 2 the dynamic control system includes components which correspond to those of the transmitter. In this receiver an expansion of the received signals is realized with this dynamic control system, which expansion is inverse to the compression realized in the transmitter. The pulses received through the line 5 control a switch 24 of the same type as pulse modulator 2 of the transmitter. The two complementary outputs 25 and 26 of these switches are connected through pulse regenerators 9 and 27 to the inputs of amplitude modulators 28 and 29, respectively. These two modulators 28 and 29 form part of the dynamic control arrangement of the receiver. These two modulators 28 and 29 control through the difference producer 30 the amplitude of the pulses applied to the integrating network 11. A dynamic control signal is applied to these two modulators, which control signal is supplied by a dynamic control signal generator which has the same structure and operation as that in the transmitter. This generator also includes a pulse series analyzer 31 which analyzer the output pulses from the switch 24 in groups. Under the same circumstances as the analyzer 19 of the transmitter this pulse series analyzer provides a pulse signal which is applied to the integrating network 32 for generating a smoothed dynamic control signal applied to the two amplitude modulators 28 and 29. The components of the analyzer 31 are denoted by the same reference numerals as the corresponding components of the analyzer 19 in the transmitter.

The pulses supplied by the pulse series analyzers 19 and 31 will hereinafter be referred to as control pulses and the signal delivered by the integrating network 23 or 32 will be referred to as control signal.

As a result of the continuous adaptation of the quantization step to the slope of the signal to be transmitted such dynamic control systems make it possible to obtain a decrease of the quantization noise and thus a satisfactory reproducing quality without the necessity of increasing the frequency of the transmitted pulses. The compression factors which may be reached are very high (in the order of 34 dB) and the control range is in the order of 30 dB. Also a high degree of insensitivity to noise and tolerances and an increase of the stability of the transmission system is obtained by using such a dynamic control system because the control signal varies both in the transmitter and in the receiver in the same manner.

A sudden increase of the quantization noise was, however, observed at the instants when for the low levels of the signal to be transmitted the dynamic control system became active and at the instants when quick variations occurred in the information signal.

According to the invention this sudden increase of the quantization noise is obviated in a simple manner while in addition the control range and the stability of the transmission system are increased.

According to the invention the integrating network which is connected to the outputs of the pulse series analyzers 19 and 31 and which includes a storage element and a resistance element in the transmitter and the receiver of FIGS. 1 and 2 is constituted by a non-linear circuit having a time constant which decreases with an increasing signal level. In the embodiment of FIGS. 1 and 2 this non-linear circuit is composed of a linear storage element, in this case the capacitors 33 and 34 and by a non-linear resistance element, in this case the diodes 35 and 36. The non-linear integrating networks 23 and 32 are connected to switched supply sources 37 and 38 in the rhythm of the output pulse signal from the pulse series analyzers 19 and 31, respectively. The dynamic control signal is derived from the resistances elements 35 and 36. In order to obtain optimum results the resistance element may be composed of a series arrangement of various diodes and in addition linear resistors 37 and 38 can be connected in series with this non-linear resistance element.

In the embodiment of FIGS. 1 and 2 the dynamic control signal is obtained by applying the current through the diodes 35 and 36 to the inputs of current voltage converters 39 and 40 which are constituted by operational amplifiers 41 and 42 having an infinitely small input resistance with feedback resistors 43, 44, respectively. The outputs of the converters 39 and 40 supply a dynamic control voltage which is applied to the amplitude modulators 13 and 14 and to 28 and 29, respectively. In the embodiment of FIGS. 1 and 2 the switched supply sources 37, 38 are constituted by npn transistors 45, 46 whose base electrodes are connected to the outputs of the pulse series analysers 19, 31 and whose collector electrodes are connected through resistors, 47, 48, respectively, to the positive terminal of a direct voltage source whose negative terminal likewise as the emitter electrode is connected to ground. The input terminals of the non-linear integrating network (terminals of capacitors 33, 34) are coupled to the emitter electrode and the collector electrode of the transistors 45, 46, respectively, the connection to the collector electrode being established through diodes 49, 50. The diodes 49, 50 are arranged in such a manner that they pass the positive current of the supply source.

The integrator 23 or 32 supplies a smoothed dynamic control voltage whose value is proportional to the mean value of the pulses supplied by the switched sources 37, 38, However, due to the non-linear character of the integrating network, which character is obtained in the relevant embodiment with the diodes 35, 36, the efficiency of the control system is greatly increased as will now be described with reference to FIGS. 3 and 4.

Figure 3:
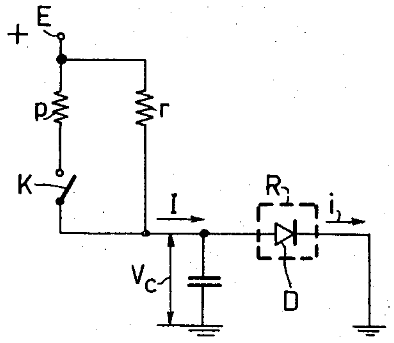
FIG. 3 shows a simplified diagram of a non-linear integrating network.

FIG. 3 shows a diagram of a circuit 23 or 32 which is reduced to its essential components. More particularly this Figure shows on the one hand a switched supply source which is represented by the series arrangement of a direct voltage source, a resistor P and a contact K controlled by the control pulses and on the other hand a non-linear integrating network which is constituted by a storage capacitor C and a resistance element R, for example, a diode. It is assumed that the voltage $V_c$ across the capacitor C remains low relative to voltage E of the direct voltage source so that the instantaneous current applied to the integrating network is equal to $I_M = E/C$ if a control pulse is present while this current is equal to zero if there is no control pulse. Due to the storage capacitor C the mean value of the current $i$ in the diode D is equal to the mean value of the current I supplied by the switched source from which current $i$ the control signal is derived. As is shown in French Patent Specification No. 2,004,446 it is advantageous to determine a minimum control signal which corresponds to a minimum quantization step.

In the relevant invention a resistor $r$ is to this end connected in parallel with the switched source so that in the absence of control pulses the current I applied to the integrating network assumes the value $I_m = E/r$ instead of zero. In FIGS. 1 and 2 the determination of a minimum quantization step is achieved by means of the resistors 51 and 52 which are arranged between the positive terminal of the direct voltage source and the output of the switched supply sources 37, 38, respectively.

When it is firstly assumed that analogous to the known technique the resistance element of the integrating network is a linear resistance having a value R, the current $i$ through the resistor R of the integrating network to which the current I is applied is given by the differential equation:

$$di/dt = 1/RC\ (I - i) \tag{1}$$

During the presence of a control pulse the current I is equal to $I_M$ so that:

$$i = I_M + (i_o - I_M).\exp(-t/RC) \tag{2}$$

in which $i_o$ is the initial current at the instant $t = O$.

Figure 4:
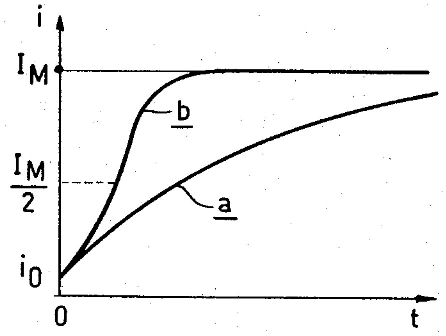
FIG. 4 shows a diagram of the current in the resistance element of this network.

The curve $a$ in FIG. 4 shows the variation of the current $i$ in the presence of a control pulse in which case this current $i$ varies in accordance with the equation (2). The slope $di/dt$ of this curve, i.e., the adjusting rate of the current i decreases from an initial value 1/RC (I $- i_o$) continuously by the value of the current $i$ as is apparent from equation (1). This means that the rate at which the dynamic control signal is adjusted to its correct value decreases when the value of this dynamic control signal increases. The initial adjusting time of the dynamic control system thus becomes longer as the initial dynamic control signal becomes larger. As a result it is possible on the one hand that the dynamic control signal cannot be adapted at the desired rate to greatly varying information signals such as, for example, speech signals while on the other hand the dynamic control system for the low levels of the information signals is slow to become active which results in an increase of the quantization noise.

When, however, a non-linear element whose resistance varies such that the time constant RC of the integrating network decreases when the current $i$ through the resistor R increases is chosen as a resistance element of the integrating network according to the invention, the expression (1) shows that the slope of the curve indicating the variation of the current $i$ is increased which results in a shorter adjusting time of the dynamic control system.

When as in FIG. 3 use is made of a diode D as a resistance element, the current through this diode varies in the presence of a control pulse in a manner which is particularly favourable for dynamic control.

As is known the relationship between the direct current $i$ in a diode and the voltage $v$ at its terminals is given by the equation:

$$i = j\{\exp (qv/KT) - 1\} \quad (3)$$

in which $j$ is the saturation current of the diode, $q$ is the charge of the electron T is the absolute temperature of the P-N junction and K is the Boltzmann constant.

It can be shown that for a current I which is applied to the integrating network, the current $i$ through the diode is given by the differential equation:

$$d(i+j)/dt = q/KTC\ (i+j)\ (I-i) \quad (4)$$

In the presence of a control pulse the current applied to the integrating network is equal to $I_M$ as has been shown above. By ignoring the ever weak saturation current $j$ of the diode relative to the current $i$ the differential equation (4) may be written as:

$$di/dt = qI_M/KTC\ (1 - i/I_M)\ i \quad (5)$$

For those values of $i$ which are low relative to $I_M$ this equation is reduced to:

$$di/dt = \tau\ .i \quad (6)$$

in which $\tau$ is a fixed time constant which is equal to $qI_M/KTC$.

This proves that immediately after the occurrence of a control pulse the current $i$ through the diode increases in accordance with an $e$-power according to the equation:

$$i = i_0 e^{\ t/\tau} \quad (7)$$

In FIG. 4 the curve $b$ shows the current $i$ through the diode as a function of time during a control pulse applied at the instant $t = o$. In the first part of this curve $b$, i.e., in the region between the ordinate point $i_o$ and the point of curvature IM/2 the curve is given with a satisfactory approximation by the function (7). In the second part of the curve $b$, i.e., in the region between ordinate point $I_M/2$ and the ordinate asymptote $I_M$ the slope of the curve decreases to zero.

In the region between $i_o$ and $I_M/2$ the slope $di/dt$ of the curve $b$ increases continuously and this in a manner which is mathematically represented by equation (6). The initial value of the slope is given by $\tau\, i_o$. In contrast to a linear integrating network a considerable increase of the adaptation rate of the dynamic control signal to the instantaneous variations of the value of the information signal is obtained over a large dynamic range. Thus a dynamic control system is realized with which a very effective reduction of the quantization noise is obtained in a very efficient manner, even for the transmission of information signals having steep edges and for information signals of low levels.

Figure 5:
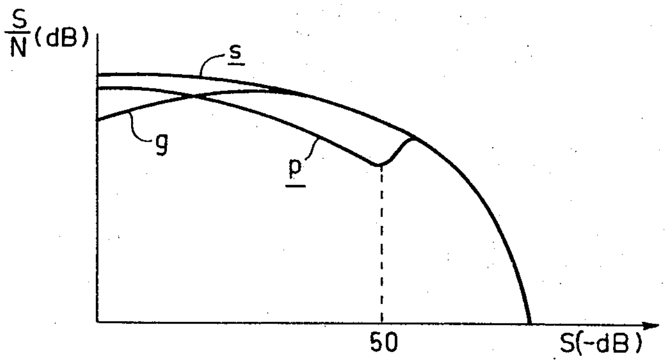
FIG. 5 shows a diagram in which the signal-to-noise ratio in a known delta modulation transmission system can be compared with the system according to the invention.

FIG. 5 shows as an example the improvement of the signal-to-noise ratio obtained by the invention. This Figure shows on a logarithmic scale the signal-to-noise ratio of the output signal as a function of the level of an information signal of 800 Hz to be transmitted. The curve $p$ relates to a known dynamic control system including a linear integrating network having a time constant RC = 2,2 mS in the circuits 23 and 32 of FIGS. 1 and 2. The said phenomenon already occurs for a signal level in the order of −50dB. The curve 2 is obtained by using the dynamic control system according to the invention in which the non-linear integrating network is built up from capacitors 33 and 34 of 15μF (FIGS. 1 and 2) and the diodes 35 and 36 while the voltage across its terminals varies by 60 mV which corresponds to a variation of 20 dB of the current through the diodes. As compared with the curve $p$ a considerable improvement of the signal-to-noise ratio is obtained from a signal level of −50 dB except for the high levels of the information signal. The curve $s$ is obtained by using a non-linear integrating network in which, however, resistors 37 and 38 of 100 Ω are arranged in series with the diodes 35 and 36. As this curve shows, this dynamic control system also gives an improvement of the signal-to-noise ratio for the high levels of the information signal; in fact, a too large reduction of the resistance constituted by the diodes is avoided. This reduction caused a considerable increase of the ripple of the dynamic control signal and hence a reduction of the signal-to-noise ratio.

In addition to an increase of the signal-to-noise ratio resulting in a considerable improvement of the reproducing quality a better stability of the transmission system is also obtained by the system according to the invention because the dynamic control signal in the transmitter and the receiver is very rapidly adapted in the same manner to the instantaneous variations of the signal to be transmitted. An increase of the dynamic control range to 60 dB was also achieved.

The different components of the circuits 23 and 32 of FIGS. 1 and 2 may alternatively be realized in a different manner. For example, in the integrating network a fixed resistor may be used as a resistance element and a capacitor may be used as a storage element which capacitance decreases proportionally to the voltage across this capacitor. Such a capacitance is constituted, for example, by a variable capacity diode. The two storage and resistance elements formed in this manner and included in the circuit arrangement in the manner as shown in FIGS. 1 and 2 yield a non-linear integrating network whose time constant TC decreases when the signal applied thereto increases and with which a current is obtained in the resistance element which current varies in the manner described above and from which the dynamic control signal is derived.

It is alternatively possible to include an inductor as a storage element in series with the resistance element in the integrating network, either with an inductor whose value decreases with the current therethrough or with a resistor whose value increases with the current therethrough. An integrating network is then obtained having a time constant L/R which decreases when the value of the signal applied to its input increases because either the inductor value decreases with the current therethrough or because the resistance of the resistance element decreases with the current therethrough. The dynamic control signal may then be derived from the voltage across the resistance element.

Figure 6:
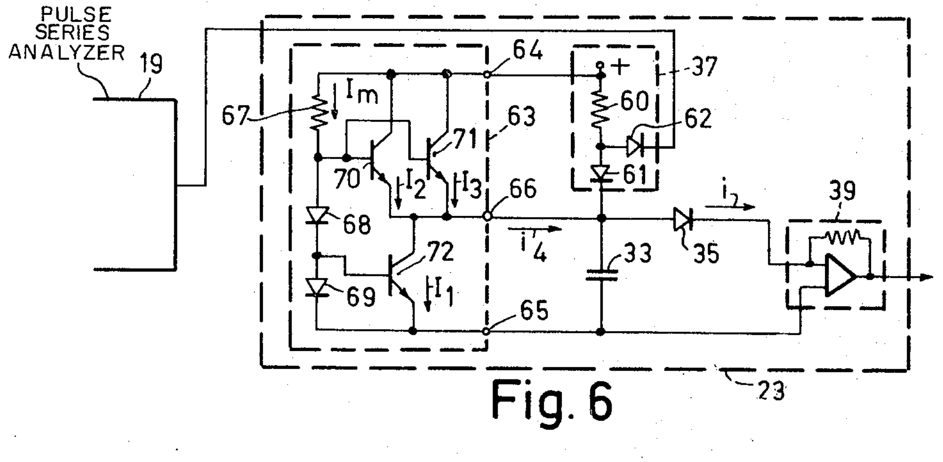
FIG. 6 shows a modification of an integrating network which can be used both in the transmitter and in the receiver of the system according to the invention and FIGS. 7 and 8 show easily integratable modifications of the transmitter and the receiver according to the invention.

FIG. 6 shows an integrating network for use in the dynamic control system, which is adapted to accelerate the decrease of the dynamic control signal in the absence of control pulses. Although the increase of the current $i$ through the diode is accelerated in the integrating network according to FIG. 3 by the application of a control pulse, the decrease of this current in this diode varies at an increasingly slower rate as this current decreases and approaches the value of the current corresponding to the minimum quantization step. The result is that the dynamic control system switches on very rapidly but only returns slowly to the rest position.

In order to reach this rest position more quickly, FIG. 6 shows a modified integrating network 23 which may be used both in the transmitter and in the receiver. The control pulses supplied by the pulse series analyzer 19 are applied to the input of this network 23. The non-linear integrating network is also constituted by the storage capacitor 33 and the diode 35 and the current $i$ through this diode is likewise applied to the current voltage converter 39 for generating the dynamic control signal. The integrating network shown in FIG. 6 differs, however, from that shown in FIGS. 1 and 2 in that the switched supply source 37 is constituted by a resistor 60 connected to the positive terminal of a direct voltage source and by two diodes 61 and 62 which are connected through a common connection point to the resistor 60 in the pass direction relative to the direct voltage source. The second terminal of the diode 61 is connected to the capacitor 33 and the second terminal of the diode 62 is connected to the output of the analyzer 19.

The network shown in FIG. 6 differs likewise from the integrating networks according to FIGS. 1 and 2 in that a circuit 63 is incorporated which makes it possible to adjust not only a minimum current in the diode 35 in order to determine a minimum quantization step, but also to accelerate the decrease of the current through this diode in the absence of the control pulses. This circuit which is provided for the purpose of supply between the terminals 64 and 65 of the direct voltage source has an output 66 connected to the integrating network 33, 35. Said circuit 63 includes the series arrangement of a resistor 67 and two diodes 68 and 69 between the terminals 64 and 65. This circuit is also provided with two transistors 70 and 71 whose corresponding electrodes are connected together and whose collector electrodes are connected to the supply terminal 64 while the base electrodes are connected to the junction of resistor 67 and the diode 68 and the emitter electrodes are connected to the output terminal 66. The emitter-collector path of a third transistor 72 is arranged between the output terminal 66 and the supply terminal 65 and its base-emitter junction is connected in parallel with the diode 69.

In order to clarify the operation of the circuit 63 the starting point is the advantageous and easily realisable case where all components are manufactured on one and the same semiconductor substrate together with the diode 35 of the integrating network while all transistors or diodes have the same dimensions so that these components convey equal currents when the same voltages are applied to the base-emitter junction of the transistors and to the junction of the diodes.

In the rest position of the circuit 23 in which the influence of the last compression pulse supplied by the switched source 37 on the current $i$ through the diode 35 is completely eliminated, the branch of the circuit constituted by the elements 67, 68, 69 conveys the same current $I_m$ whose value is determined by the value of resistor 67. The voltage drop across the diode 69 caused by this current $I_m$ produces a current $I_1$ in the collector electrode of transistor 72 which current is approximately equal to $I_M$. Both transistors 70 and 71 supply the currents $I_2$ and $I_3$ so as to constitute a sum current $I_2 + I_3$ which is distributed approximately equally between the transistor 72 and diode 45. The output terminal 66 thus provides a current $I_4$ in the rest position, which current is approximately equal to $I_M$ and which has a direction corresponding to the charge direction of the capacitor 33 while the diode 35 also conveys a current $i$ which is unequal to $I_m$ and which discharges the capacitor 33 so that a minimum quantization step is determined.

In a second state, when a control pulse occurs, the switched supply source 37 causes a quick increase of the voltage across the capacitor 33 so that the sum current $I_2 + I_3$ decreases rapidly. Since the voltage across the diode through which the current $I_m$ flows remains the same, the current $I_1$ through the transistor 72 remains unchanged, and to compensate for the reduction of the sum current $I_2 + I_3$ a current $I_4$ having a maximum value $I_m$ is quickly adjusted across the output terminal 66, which current has a direction which is opposite to the direction of $I_4$ in the rest condition so that this current has the tendency to discharge the capacitor 33.

In a third state which occurs after the disappearance of a compression pulse the capacitor 33 is discharged by the current $i$ through the diode 35 and by the current $I_4$ adjusted during the control pulse. As a result the discharge of the capacitor 33 and the decrease of the current $i$ is accelerated.

When the voltage across capacitor 33 reaches a value which corresponds to a value of $i$ in the order of 6 dB above its final value $I_m$, the current $I_4$ becomes equal to zero and subsequently increases in the opposite direction to assume the value $I_m$ corresponding to the rest condition.

It is to be noted that since the extra discharge current of the capacitor 33 is limited to a value $I_m$, the decrease of the dynamic control signal for the low levels of this signal can be accelerated by the above-described circuits without influencing the quick increase of the dynamic control signal for the higher levels of this signal.

Figure 7:
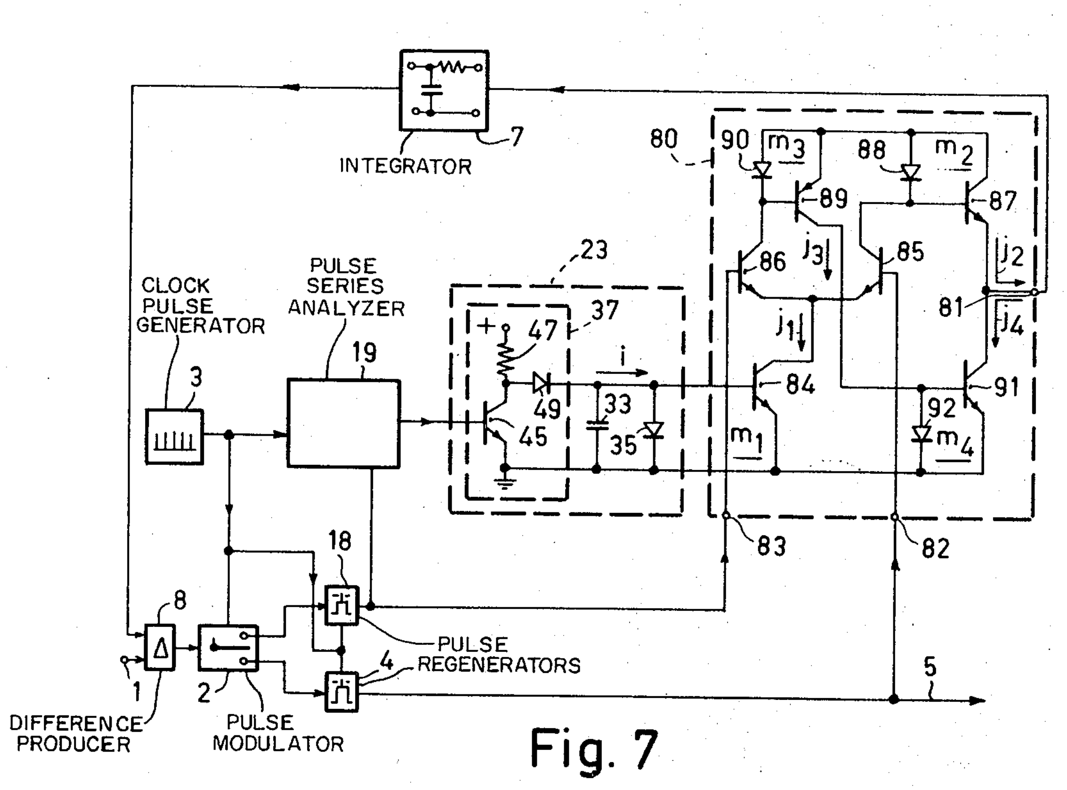
Figure 8:
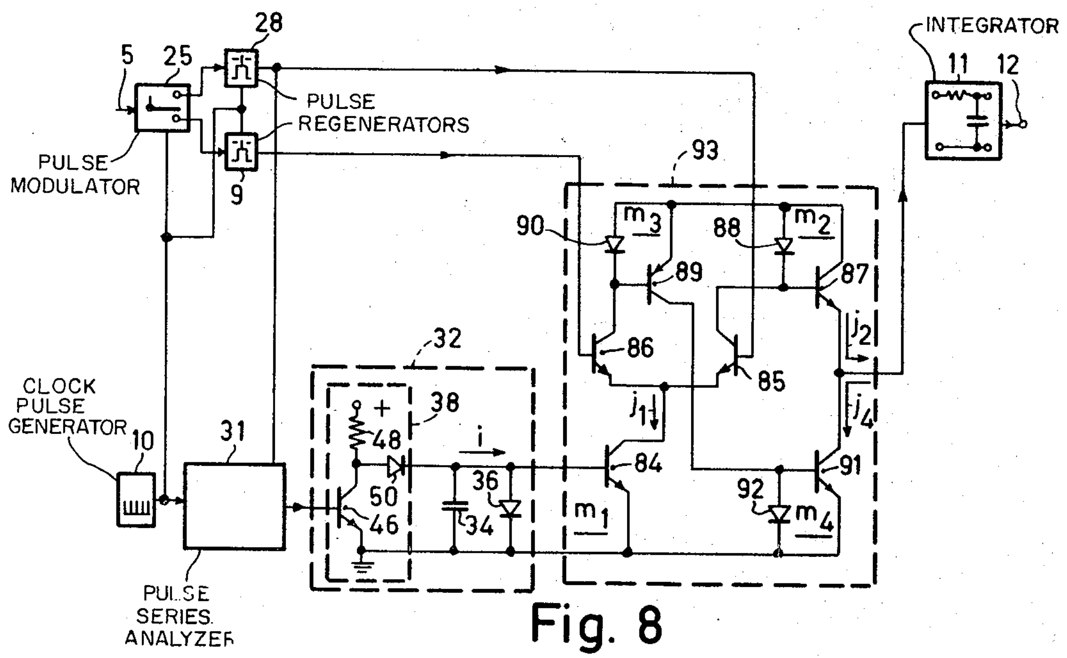

FIGS. 7 and 8 show embodiments of a receiver and a transmitter in the transmission system according to the invention. These arrangements show inter alia an amplitude modulation circuit which is eminently suitable to be connected to a diode used as a non-linear resistance element of the integrating network while this arrangement causes the quantization step to vary without introducing distortion and can be easily integrated in a semiconductor body.

In FIG. 7 the greater part of the components of the transmitter of FIG. 1 has corresponding reference numerals. The signal to be transmitted and the signal supplied by the integrating network 7 are applied to the inputs of the difference producer 8. The output of the difference producer 8 is connected to the pulse modulator 2. The two complimentary signals provided by the modulator 2 are applied to the pulse regenerator 4 and 18 one of which, for example, 4 provides the coded pulses to be transmitted to the receiver. The dynamic control system includes the pulse series analyzer 19 to which the coded pulse series supplied by the regenerator 18 are applied, the control pulses provided by this analyzer being applied to a circuit 23 which according to the invention consists of the storage capacitor 33 and a non-linear resistance element constituted by by the diode 35. The terminals of the diode 35 are directly connected to a modulation circuit 80 which fulfils the function of the amplitude modulator 13, 14 and the difference producer 15 of FIG. 1. The output 81 of this circuit 80 is connected to the integrating network 7 for generating the comparison signal. In addition the mutually complimentary pulses provided by the pulse regenerators 4 and 18 are applied to the terminals 82 and 83 of the modulation circuit 80.

The modulation circuit 80 comprises on its input side a transistor 84 whose base-emitter junction is connected in parallel with the junction of the diode 35. This base-emitter junction of the transistor 84 constitutes together with the diode 35 the non-linear resistance element of the integrating network and the total current which flows through this non-linear element is the current indicated above by $i$ which is used for the dynamic control. The circuit $m_1$ which is formed by the diode 35 and the transistor 84 is the simplest embodiment of a so-called "current mirror" in which circuit the transistor 84 behaves as an ideal current generator providing a current $j_1$ which is an almost perfect image of the current $i$ applied to its input when the diode junction 35 and the base-emitter junction of the transistor 84 are satisfactorily combined, which is automatically effected when the diode 35 and the transistor 84 are integrated on one semiconductor substrate. In that case the relation $j_1/i$ is substantially only dependent on the surface of two junctions.

The output of the current mirror $m_1$ is connected to the connection point of the emitter electrodes of the transistors 85 and 86. The base electrodes of these transistors 85 and 86 are connected to the terminals 82 and 83, respectively, and their collector electrodes are connected to inputs of current mirrors $m_2$ and $m_3$, respectively.

In the embodiment shown these current mirrors are constituted by the transistor 87 in combination with the diode 88 and by the transistor 89 in combination with the diode 90, respectively. The output of the current mirror $m_2$ is connected to the output 81 of the modulation circuit 80. The output of the current mirror $m_3$ is connected to the input of a current mirror $m_4$ which is constituted by a transistor 91 in combination with a diode 92. The output of the current mirror $m_4$ is likewise connected to the output 81.

The operation of the modulation circuit 80 is as follows:

Dependent on the value of the complimentary coded pulses applied to the base electrodes of the transistors 85 and 86, either the transistor 85 is conducting and the transistor 86 is cut off or the transistor 85 is cut off and the transistor 86 is conducting. Both transistors 85 and 86 thus operate as a current switch for the current $j_1$. In the first case (transistor 85 conducting) the current $j_1$ is applied to the input of the current mirror $m_2$ which supplies a current $j_2$ at the output 81 in a direction which increases the signal provided by the integrating network 7. In the second case (transistor 86 conducting) the current $j_1$ is applied to the input of the current mirror $m_3$ which provides a current $j_3$ for the input of the current mirror $m_4$. This produces a current $j_4$ at the input 81 in a direction which results in the comparison signal supplied by the integrating network 7 decreasing. The currents $j_1$ and $j_4$ are ultimately images of the current $i$ of the integrating network and reproduce this current without distortion. By integrating the components of the circuit 80 on one semiconductor substrate these currents may be made exactly equal to each other so that for the same current $i$ the same quantization step is obtained for increasing and decreasing values of the signal to be transmitted.

FIG. 8 shows a modification of the receiver according to FIG. 2. In this FIG. 8 the components corresponding to those in FIG. 2 have the same reference numerals. In this receiver likewise as in the transmitter of FIG. 7 a modulation circuit 93 is used which has exactly the same structure as the modulation circuit 80 in the transmitter according to FIG. 7 and operates in the same manner. In this modulation circuit 93 the base-emitter junction of the input transistor 84 is connected in parallel with the diode 36 of the integrating network in the circuit 32. The base electrodes of the transistors 85, 86 arranged as switches receive complimentary code pulses through pulse regenerators 9 and 28. The output of the modulation circuit 93 is connected to the integrating network 11 which reproduces the transmitted signal in an analog form. The modulation circuit 80 of the transmitter and 93 of the receiver may be buily in such a manner by integration in a semiconductor body so that the operation of the dynamic control system is the same in the transmitter and in the receiver, thus improving the stability of the transmission system.

What is claimed is:

1. A transmitter for the transmission of information signals by pulse code modulation, comprising a pulse modulator for providing output pulses, the output pulses from said pulse modulator comprising the output of said transmitter, a clock pulse generator connected to an input of the modulator, a pulse series analyzer means connected to the output of the clock pulse generator and to the output of the pulse modulator for analyzing successively occurring pulse series from the modulator within fixed time intervals of at least three successive pulses from the clock pulse generator and for supplying a pulsatory output signal in response to a modulator output pulse series exceeding a predetermined modulation index within the fixed time intervals, a first non-linear integrating network connected to the output of the pulse series analyzer for supplying a continuously variable dynamic control signal, the first non-linear integrating network comprising a storage element and a non-linear resistance element connected to the storage element, the first non-linear integrating network having a time constant that decreases with increasing signal level, a switched supply source connected to the output of the first non-linear integrating network, means connecting the pulse modulator output to the switched supply source for switching the output of the first non-linear integrating network in the rhythm of the pulsatory output from the pulse series analyzer, the dynamic control signal being derived from the non-linear resistance element of the first non-linear integrating network, a second integrating network connected to the output of the switched supply source, a difference producer having a first input connected to the output of the second integrating network and having a second input for receiving the information signals to be transmitted, the output of the difference producer being connected to the pulse modulator.

2. A transmitter as claimed in claim 1, wherein the storage element of the first non-linear integrating network comprises a linear capacitor, and wherein the non-linear resistance element of the first non-linear integrating network comprises a junction of a semiconductor device connected in parallel with the capacitor.

3. A transmitter as claimed in claim 1, wherein the storage element of the first non-linear integrating network comprises a capacitor, and wherein the non-linear resistance element of the first non-linear integrating network comprises a cascade circuit of a plurality of semiconductor junctions, a low input resistance amplifier, means connecting the input of the low input resistance amplifier to the cascade circuit, the low resistance amplifier supplying the dynamic control signal.

4. A transmitter as claimed in claim 1, wherein the storage element of the first non-linear integrating network comprises a capacitor, and wherein the non-linear resistance element of the first non-linear integrating network comprises the input resistance of a current mirror circuit.

5. A transmitter as claimed in claim 4, wherein the input resistance of the current mirror circuit comprises a diode junction, the first non-linear integrating network further comprising a transistor whose collector-electrode constitutes the output of the current mirror, the diode junction being connected in parallel to the base-emitter junction of said transistor.

6. A transmitter as claimed in claim 4, wherein said switched supply source is connected to the output of the current mirror and to the modulator for supplying the second integrating network sequentially with equal and oppositely directed currents.

7. A transmitter as claimed in claim 2, further comprising a linear resistor connected in series with the non-linear resistance element of the first non-linear integrating network.

8. A transmitter as claimed in claim 1, further comprising a direct voltage supply source connected to the first non-linear integrating network for providing a minimum dynamic control signal.

9. A transmitter as claimed in claim 2, further comprising a direct voltage supply source, a first transistor, the collector and emitter electrodes of the first transistor being connected in parallel with the capacitor, two further transistors, means connecting the emitter electrode of the first transistor to a terminal of the direct voltage supply source through the emitter-collector paths of the two further transistors, a resistor, a first diode, a second diode, means connecting the resistor and first and second diodes in series between the two terminals of said direct voltage supply source, means connecting the connection point of the resistor and one of said diodes to the interconnected base electrodes of said two further transistors, the common terminal of the first and second diode being connected to the base of the first transistor.

10. A receiver for receiving information signals transmitted by pulse code modulation, comprising a pulse modulator comprising the input of a receiver for providing output pulses, a clock pulse generator connected to an input of the modulator, a pulse series analyzer means connected to the output of the clock pulse generator and to the output of the pulse modulator for analyzing successively occurring pulse series from the modulator within fixed time intervals of at least three successive pulses from the clock pulse generator and for supplying a pulsatory output signal in response to a modulator output pulse series exceeding a predetermined modulation index within the fixed time intervals, a first integrating network connected to the output of the pulse series analyzer for supplying a continuously variable dynamic control signal, the first integrating network comprising a storage element and a non-linear resistance element connected to the storage element, the first integrating network having a time constant decreasing with increasing signal level, a switched supply source connected to the output of the first integrating network, means connecting the pulse modulator output to the switched supply source for switching the output of the first integrating network in the rhythm of the pulsatory output from the pulse series analyzer, the dynamic control signal being derived from the non-linear resistance element of the first integrating network, and a second integrating network connected to the output of the switched supply source, the second integrating network comprising the output of the receiver.

11. A receiver as claimed in claim 10, wherein the storage element of the first integrating network comprises a linear capacitor connected to the output of the switched supply source, and wherein the non-linear resistance element of the first integrating network comprises a semiconductor junction connected in parallel with the capacitor.

12. A receiver as claimed in claim 10, wherein the storage element of the first integrating network comprises a capacitor, and wherein the non-linear resistance element comprises a cascade circuit of a plurality of semi-conductor junctions, and a low input resistance amplifier for supplying the dynamic control signal, the cascade circuit being applied to the input of the amplifier.

13. A receiver as claimed in claim 10, wherein the storage element of the first integrating network comprises a linear capacitor, and wherein the non-linear resistance element of the first integrating network comprises an input resistance of a current mirror circuit.

14. A receiver as claimed in claim 13, wherein the input resistance of the current mirror circuit comprises a diode, a transistor, means connecting the diode in parallel with the base-emitter junction of the transistor, the collector of the transistor constituting the output of the current mirror.

15. A receiver as claimed in claim 13, wherein said switched supply source comprises a two-position switching network connected to the output of the current mirror and comprising means for alternately supplying equal and oppositely directed currents to the second integrating network of the receiver.

16. A receiver as claimed in claim 10, further comprising a linear resistor connected in series with the non-linear resistance element of the first integrating network.

17. A receiver as claimed in claim 10, further comprising a direct voltage supply source means connected to the non-linear integrating network for providing a minimum dynamic control signal.

18. A receiver as claimed in claim 11, further comprising a direct voltage supply source, a first transistor, means connecting the collector and emitter electrodes of the first transistor in parallel with the terminals of the capacitor, means connecting the emitter electrode of the first transistor to a first terminal of the direct voltage supply source, two further transistors, means connecting the collector of the first transistor to a second terminal of the direct boltage supply source through the emitter-collector paths of said two further transistors, a resistor, a first diode, a second diode, means connecting the resistor, the first diode and second diode in series across the two terminals of said direct voltage source, the common terminal of the resistor and the first diode being connected to the interconnected base electrodes of said two further transistors, the common terminal of said first and second diode being connected to the base electrode of said first transistor.

19. An arrangement for the transmission of information signals by pulse code modulation from a transmitter to a receiver, comprising a first pulse modulator in the transmitter for providing output pulses, means for transmitting the output pulses from the first pulse modulator to the receiver, a first clock pulse generator in the transmitter connected to an input of the first modulator, a first pulse series analyzer means in the transmitter connected to the output of the first clock pulse generator and to the output of the first pulse modulator for analyzing successively occurring pulse series from the first pulse modulator within fixed time intervals of at least three successive pulses from the first clock pulse generator and for supplying a pulsatory output signal in response to a first pulse modulator output pulse series exceeding a predetermined modulation index within the fixed time intervals, a first integrating network in the transmitter connected to the output of the first pulse series analyzer for supplying a continuously variable dynamic control signal, the first integrating network comprising a first storage element and a first non-linear resistance element connected to the first storage element, the first integrating network having a time constant that decreases with increasing signal level, a first switched supply source connected to the output of the first integrating network, means connecting the first pulse modulator output to the first switched supply source for switching the output of the first integrating network in the rhythm of the pulsatory output from the first pulse series analyzer, the dynamic control signal being derived from the first non-linear resistance element of the first integrating network, a second integrating network in the transmitter connected to the output of the first switched supply source, a difference producer having a first input connected to the output of the second integrating network and having a second input for receiving the information signals to be transmitted, the output of the first difference producer being connected to the first pulse modulator, a second clock pulse generator in the receiver corresponding to the first clock pulse generator in the transmitter, a second pulse modulator in the receiver corresponding to the first pulse modulator in the transmitter, a second pulse series analyzer in the receiver corresponding to the first pulse series analyzer in the transmitter, a third integrating network in the receiver corresponding to the first integrating network in the transmitter, a second switched supply source in the receiver corresponding to the first switched supply source in the transmitter, the second clock pulse generator, second pulse modulator, second pulse series analyzer, third integrating network and second switched supply source in the receiver being structurally interconnected and functionally interrelated in the same manner as those corresponding elements of the transmitter, a fourth integrating network in the receiver connected to the output of the second switched supply source for providing an information output signal of the receiver, and means for connecting the output pulses transmitted from the first pulse modulator to the second pulse modulator.

* * * * *

UNITED STATES PATENT AND TRADEMARK OFFICE

CERTIFICATE OF CORRECTION

PATENT NO. : 3,868,574

DATED : February 25, 1975

INVENTOR(S) : GIBERT MARIE MARCEL FERRIEU and JOHANNES WILHELMUS GLASBERGEN

It is certified that error appears in the above-identified patent and that said Letters Patent are hereby corrected as shown below:

IN THE TITLE

After "MODULATION" should be --USING A DYNAMIC CONTROL LOOP INCLUDING A NONLINEAR INTEGRATING NETWORK--;

IN THE SPECIFICATION

Col. 1, line 57, "body, a semiconductor" should be --in a semiconductor body, etc.--;

line 58, cancel "bodoy, etc.";

Col. 6, line 56, equation 2 should read:

$$--i = I_M + (i_o - I_M).\exp(-\frac{t}{RC})--;$$

Col. 7, line 30, equation 3 should read:

$$--i = j \left\{ \exp\left(\frac{qV}{KT}\right) - 1 \right\} --;$$

UNITED STATES PATENT AND TRADEMARK OFFICE

CERTIFICATE OF CORRECTION

PATENT NO. : 3,868,574 Page 2

DATED : February 25, 1975

INVENTOR(S) : GIBERT MARIE MARCEL FERRIEU and JOHANNES WILHELMUS GLASBERGEN

It is certified that error appears in the above–identified patent and that said Letters Patent are hereby corrected as shown below:

Col. 7, line 40, equation 4 should read:

$$-- \frac{d(i+j)}{dt} = \frac{q}{KTC} (i + j) (I-i) --;$$

line 50, equation 5 should read:

$$-- \frac{di}{dt} = \frac{qI_M}{KTC} (1 - \frac{i}{I_M}) i --;$$

Col. 8, line 32, "curve 2" should be --curve g--;

Signed and Sealed this

*eighteenth* Day of *November 1975*

[SEAL]

*Attest:*

RUTH C. MASON
*Attesting Officer*

C. MARSHALL DANN
*Commissioner of Patents and Trademarks*